US009582247B1

(12) United States Patent
Milliron et al.

(10) Patent No.: US 9,582,247 B1
(45) Date of Patent: Feb. 28, 2017

(54) PRESERVING DATA CORRELATION IN ASYNCHRONOUS COLLABORATIVE AUTHORING SYSTEMS

(75) Inventors: Timothy S. Milliron, Oakland, CA (US); Robert Jensen, Berkeley, CA (US); Brad Andalman, Oakland, CA (US); Adam Woodbury, San Francisco, CA (US); Dirk Van Gelder, San Francisco, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 13/419,886

(22) Filed: Mar. 14, 2012

Related U.S. Application Data (63) Continuation of application No. 12/356,059, filed on Jan. 19, 2009, now abandoned.

(51) Int. Cl.
*G06T 13/00* (2011.01)
*G06F 7/02* (2006.01)

(52) U.S. Cl.
CPC ..................................... *G06F 7/02* (2013.01)

(58) Field of Classification Search
None
See application file for complete search history.

(56) References Cited

U.S. PATENT DOCUMENTS

| 2004/0015468 A1* | 1/2004 | Beier et al. ................. 707/1 |
| 2005/0198160 A1* | 9/2005 | Shannon et al. ............. 709/206 |
| 2007/0294270 A1* | 12/2007 | Gregory et al. ............. 707/100 |

* cited by examiner

*Primary Examiner* — Weiming He
(74) *Attorney, Agent, or Firm* — Patterson + Sheridan LLP (57) ABSTRACT

To prevent correlated data from being inadvertently altered by subsequent modifications or additions, changes to correlated data are automatically detected. Corrections may be automatically applied to data to preserve data correlation. Change detection data is determined from an initial correlation between source data and dependent data. The change detection data is stored in association with the dependent data. A subsequent evaluation of the data defines a current correlation between the source data and the dependent data. The current correlation is evaluated with the change detection data to determine if the current correlation differs from the initial correlation. If the current correlation between source data and dependent data does not match the initial correlation, the current correlation is reevaluated using topological; geometric, or other analysis techniques. The reevaluated correlation can be provided as part of the authored state of a computer graphics component.

24 Claims, 6 Drawing Sheets

PRESERVING DATA CORRELATION IN ASYNCHRONOUS COLLABORATIVE AUTHORING SYSTEMS

CROSS-REFERENCE TO RELATED APPLICATIONS

This application is a continuation of U.S. patent application Ser. No. 12/356,059, filed Jan. 19, 2009, and entitled "Preserving Data Correlation in Asynchronous Collaborative Authoring Systems," which is incorporated by reference herein for all purposes.

BACKGROUND

The present invention relates to the field of computer graphics, and in particular to methods and apparatus for creating, modifying, and using components to create computer graphics productions. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry; texture maps, other arrays of data, lighting, and shading programs used to determine the visual appearance of models; and animation data and deformer functions used to specify changes and motion over time.

Digital production pipelines include modeling, shading, articulation, animation, simulation, layout, lighting, and rendering. Modeling is the creation of the three-dimensional geometry of characters, sets, props, and other objects. Shading is the specification of optical attributes of the surface and interior of objects. Articulation is the specification of joints and other moveable elements of objects. Animation specifies the motion of objects over time in one or more scenes, often with reference to the objects' articulation. Simulation specifies the motion, appearance, and/or behavior of objects. Layout specifies the arrangement of objects and cameras in one or more scenes. Lighting defines the location and other attributes of light in one or more scenes. Rendering produces images or animation from the components.

Users at each stage of the digital production pipeline create or modify numerous components to be used in creating a computer graphics image, animation, or other type of production using one or more software application tools. Components are typically combined during rendering to produce an animated sequence. For example, geometric models, shading programs and data, lighting, animation data, and deformers all need to be combined correctly to produce a rendered image or scene.

Often, components have complex relationships. For example, the geometry of a model may be defined as a mesh of connected points. Deformer components define the movement and deformation of these connected points. The effect of a deformer component may vary at different points of a mesh. To implement this, the points of a mesh are assigned different weight values. Each point's weight modulates or changes the effect of a deformer component on its respective point. The association between points and their deformer weights is an example of correlated data.

In a collaborative environment, different users may asynchronously create and/or modify correlated data. For example, a modeling user may specify mesh points, and an articulation user may specify deformer functions and deformer weights for these mesh points. In another example, a layout user may specify the placement of objects in a scene, and a lighting user may specify the influence of lights on these objects.

One problem with correlated data is that a user may change one component and inadvertently break the correlation with another component. For example, if a user modifies model geometry by adding or removing mesh points, this may cause the deformer weights previously specified to become invalid. For example, if a mesh point is deleted, a deformer weight may become assigned to a non-existent point or inadvertently associated with the wrong part of the mesh. This problem is especially acute in collaborative environments, where different users author components independently of each other and often unaware of the precise relationships between components.

SUMMARY

To prevent correlated data in components from being inadvertently altered by modifications to components or the addition of new components, an embodiment of the invention includes methods for detecting changes to correlated data and applying corrections to data to preserve data correlation. In an embodiment, change detection data is determined in response to the creation of an initial correlation between source data and dependent data. The change detection data is stored in association with the dependent data.

Subsequent evaluations of the data may define a current correlation between the source data and the dependent data. An embodiment automatically evaluates the current correlation using the change detection data previously stored in association with the dependent data. If the current correlation between source data and dependent data does not match the initial correlation that was used to determine the change detection data, an embodiment of the invention automatically reevaluates the correlation between the source data and the dependent data.

Embodiments of the invention may reevaluate the correlation between source data and dependent data using data topology; geometry in coordinate spaces of one, two, three, or more dimensions; user input; the change detection data; and weightings, projections, interpolations, and any other any technique known in the art for transferring attributes between different geometries, topologies, or other types of data sets. The reevaluated correlation between source and dependent data can be provided as part of the authored state of a computer graphics component.

BRIEF DESCRIPTION OF THE DRAWINGS

The invention will be described with reference to the drawings, in which.

DETAILED DESCRIPTION

Figure 1A:
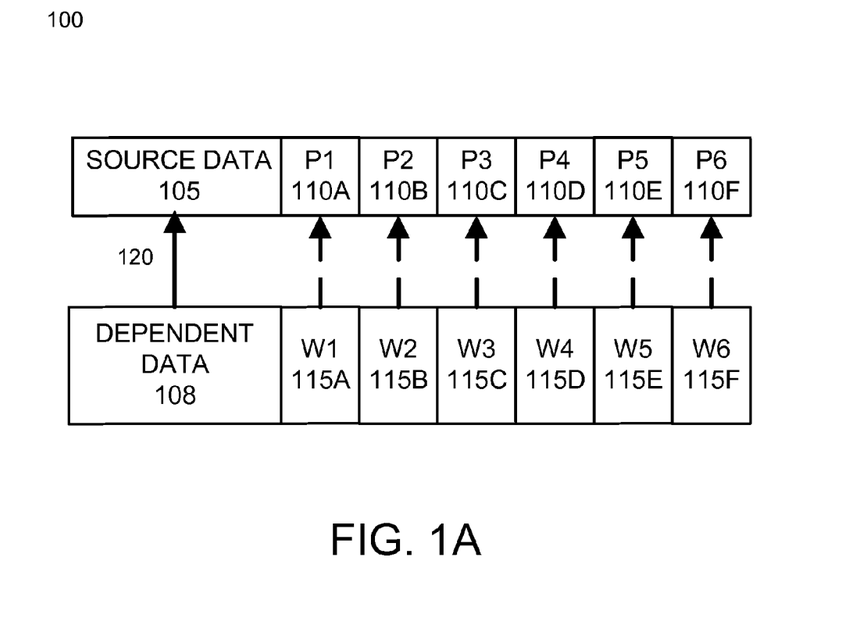
FIGS. 1A and 1B illustrate examples of data correlation suitable for use with embodiments of the invention.
Figure 1B:
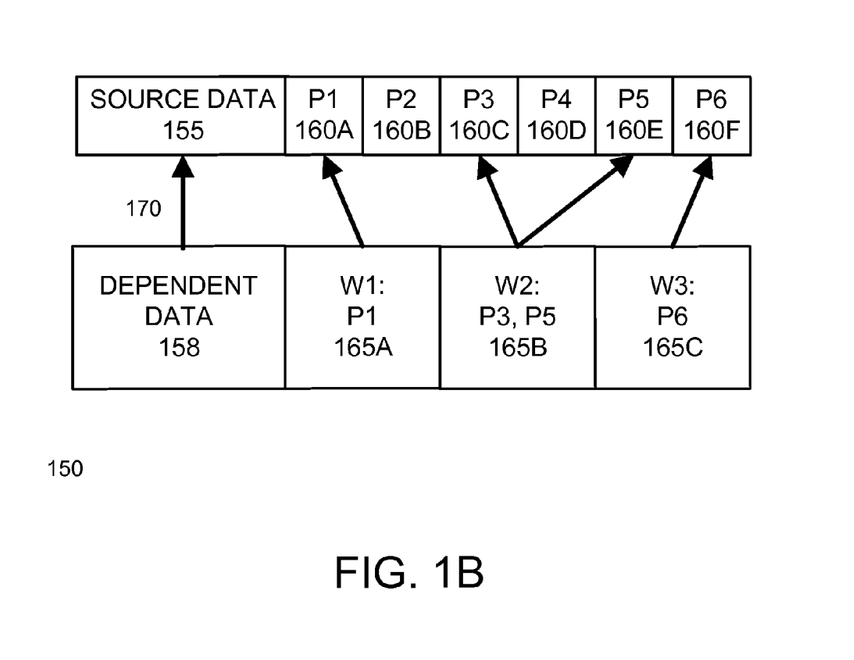

FIGS. 1A and 1B illustrate examples of data correlation suitable for use with embodiments of the invention. FIG. 1A illustrates an example 100 of a one-to-one data correlation between components. In example 100, a first component 105 specifies source data, such as a set of points 110 defining geometry. Component 105 includes points 110a, 110b, 110c, 110d, 110e, and 110f. The number of points 110 in component 105 is provided for purposes of illustration and a component may include any arbitrary number of points or other data elements. Other examples of source data include edges, polygons, meshes, higher-order or subdivision surfaces, volumetric cells, solid geometry, or any other type of type of computer graphics data or component.

Example 100 also includes a second component 108 specifying dependent data 115 to be associated with the source data 110 of first component 105. Component 108 includes dependent data elements 115a, 115b, 115c, 115d, 115e, and 115f. Dependent data elements 115 of component 108 may be used for any purpose, including for example specifying the weight or effect of deformer functions on points, specifying other articulation or animation effects, specifying illumination and shading operations, specifying color, specifying simulation effects, or any other type of computer graphics effect. Dependent data elements can include any arbitrary type or structure of data, including scalar data, vector data, tuple data, array data, data structures, and data objects.

In example 100, an association 120 is defined between component 105 and component 108. Association 120 serves to assign the dependent data elements 115 of component 108 to the points 110 of component 105. In this example, the assignment of dependent data elements 115 to points 110 is implicit based on the ordering of data elements within the components 105 and 108. For example, the first dependent data element 115a of component 108 is assigned with the first point 110a of component 105, the second dependent data element 115b of component 108 is assigned with the second point 110b of component 105, and so forth. Thus, dependent data elements 115a, 115b, 115c, 115d, 115e, and 11f are assigned to points 110a, 110b, 110c, 110d, 110e, and 110f, respectively.

FIG. 1B illustrates an example 150 of a sparse data correlation between components. In example 150, each data element of one component may be associated with zero, one, or more than one data element of the associated component. Example 150 includes a first component 155 specifying a set of points 160 defining geometry. Component 155 includes points 160a, 160b, 160c, 160d, 160e, and 160f.

Example 150 also includes a second component 158 specifying dependent data elements 165 to be associated with the points 160 of first component 155. Component 158 includes dependent data elements 165a, 165b, and 165c.

In example 150, an association 170 is defined between components 155 and 158. Association 170 serves to assign the dependent data elements 165 of component 158 to the points 160 of component 155. Each of the dependent data elements 165 includes at least one reference to one of the points 160 of component 155. For example, dependent data element 165a is associated with the first data element of component 155, which is point P1 160a. Similarly, dependent data element 165b is associated with the third and fifth data elements of component 155, which are points P3 160c and P5 160E. Dependent data element 165c is associated with the sixth data element of component 155, which is point P6 160f. In example 150, each of the dependent data elements 165 specifies an index or position of one or more associated points of component 155.

In both examples 100 and 150, the number and/or order of data elements in a component determines the assignment of dependent data elements to points. If the number or order of either points or dependent data elements in example 100 is changed, the assignment of dependent data elements to points will also be changed. Similarly, if either the number or order of points in example 150 is changed, the assignment of dependent data elements to points may also be changed. Because of this, any changes to the components in these examples 100 and 150 will inadvertently alter the assignment of dependent data elements to points.

Source data elements and dependent data elements may be created at the same time or defined at different times, by different users, and/or using different software applications. The association or data correlation between source data components and dependent data components may be defined at the time of creation of the dependent data component and/or source data component.

In an embodiment, the association, such as association 120 or 170, between the source data component and dependent data component is defined explicitly. For example, the dependent data component can include an explicit reference to its associated source data component. Examples of explicit references include identifiers, such as paths or GUIDs, pointers, and indices into arrays or other data structures. In other example, a third component may include explicit references to the source data and/or dependent data components.

In another embodiment, the association, such as association 120 or 170, between the source data component and dependent data component is defined implicitly. For example, both the source and dependent data component may be included within a third component. In this example, the inclusion of both source and dependent data components within a third component creates an implicit association between the source data and dependent data.

In an embodiment, the association or data correlation between source data and dependent data components is resolved or determined at the time of creation of these components. In other embodiments, the association or data correlation between source data and dependent data components is not resolved or determined until after the these components are created. For example, a dependent data component may include a direct or indirect reference to a source data component. In this example, the system does not resolve this reference to identify the source data component until a later time, such as at the time the scene data is processed for rendering.

Figure 2A:
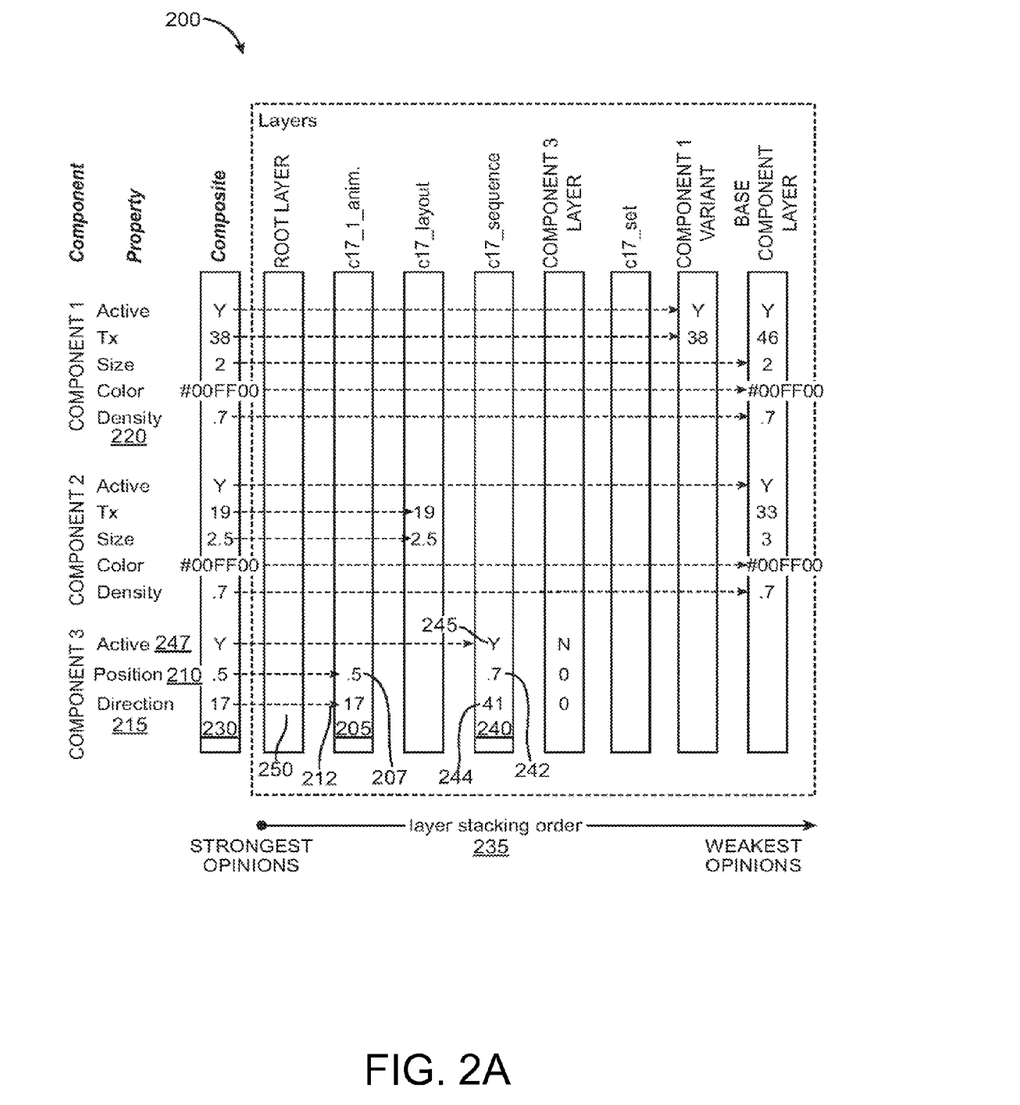
FIGS. 2A and 2B illustrate the use of layer data structures specifying attributes of components including data correlation according to an embodiment of the invention.
Figure 2B:
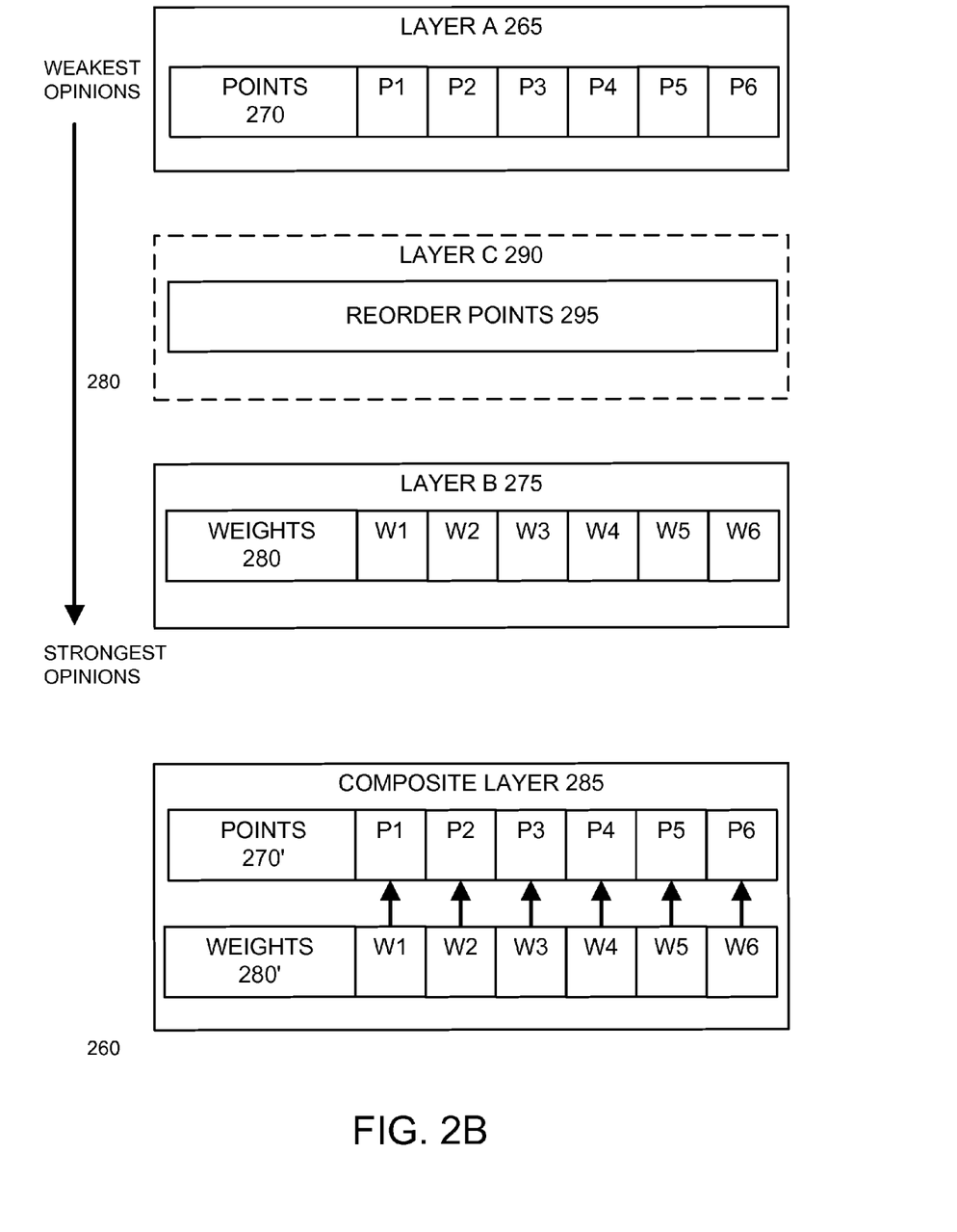

In an embodiment, the attributes of components, include any association or data correlation between components, may be specified using layer data structures. FIGS. 2A and 2B illustrate the use of layer data structures specifying attributes of components including data correlation according to an embodiment of the invention.

FIG. 2A illustrates a layers data structure 200 specifying attributes of components in one or more scenes according to an embodiment of the invention. In an embodiment, a component in one or more scenes is represented using one or more layers of a layer data structure. The layer data structure stores opinions of attribute values for a component. In this embodiment, each non-empty layer is adapted to include an opinion of the value of at least one attribute of at least one component. As discussed in detail below, each layer can override opinions of attribute values from weaker or lower-level layers.

Each layer may be sparsely populated—that is, a layer does not have to include every component in a scene and, moreover, a layer does not have to include opinions for the values of every attribute of any component. Each layer can specify an opinion of value for a new attribute of a component without having that attribute explicitly declared by a prior layer. A layer can include opinions of value for attributes of multiple components. Additionally, empty layers can be created in early stages of the digital production pipeline as placeholders for opinions of attribute values to be provided at later stages of the digital production pipeline.

In example layer data structure 200, layer 205 includes an opinion 207 that the position attribute 210 of component 3 should be set to a value of 0.5 and an opinion 212 that the direction attribute 215 of component 3 should be set to a value of 17. As can be seen in this example, the opinions of value of other attributes, such as the density attribute 220 of component 1 is undefined in layer 205.

In the above example, attribute values are numerical parameters. However, embodiments of layer data structure 200 allow the specification of any data type for an attribute value, including integers; floating point numbers; characters; strings; Boolean values; geometry data; compound data types such as vectors with two or more dimensions, matrices, structures, arrays, dictionaries, hash tables, elements of edit decision lists; references to one or more components; references to one or more layers; references to elements, tables, or other structures of a database; and references to internal or external functions, scripts, or executable programs.

Layers provide opinions of value for attributes of components in terms of the semantic structure associated with the components. Any arbitrary abstract attribute of a component can be expressed in a layer. Furthermore, one or more layers can provide opinions of value for the attribute of a component in the unique terms or semantic structure defined for that attribute. There is no need to reduce opinions of value of abstract attributes to a common or low-level form, such as pixels or points, to composite the values.

For example, a first layer can specify a model of a character wearing a hat. One attribute of the hat could be its type, such as "sombrero." Thus, the first layer could set a "hat type" attribute of the component to a value of "sombrero." Thus, from the view of the first layer, the character model should have a sombrero. A second layer that is higher or stronger than the first layer could change the hat type attribute of the component from "sombrero" to "top hat." Thus, from the view of the second layer, the character model should have top hat. A third layer that is higher or stronger than the second layer could specify that a color attribute of the hat should be "purple" and a material attribute should be "felt." Thus, from the view of the third layer, the character should have a purple felt top hat. In this example, each layer expresses an opinion of one or more attribute values in terms of the semantics associated with each attribute.

Furthermore, a component may include a reference to another component defined by one or more layers. For example, a Hat component of a character model can be a reference to a specific model of a hat. Thus, when reference is set to a "sombrero" component, the character model includes a model of a sombrero. When the reference is overridden by a layer to a "top hat" component, the character model is changed to include a model of a top hat. Each of these models can be defined by one or more layers, the attributes of which can be wholly or partially or overridden by other layers as described above.

In an embodiment, every layer in the digital production pipeline is associated with one or more tasks or activities. Users can create and manipulate layers manually to provide additional control and ease of use for a component. For example, the attributes of different models can be specified in separate layers. In another example, related attribute values for different models in a scene can be specified in the same layer to facilitate easy manipulation. In an embodiment, applications associated with activities can automatically create, access, and modify layers based on context, such as the activity, the type of component, and the action being performed by the user.

The complete authored state of one or more components in one or more scenes at a given point of the digital production pipeline is determined by compositing all of the layers associated with a given point to produce a composite layer 230. The composite layer 230 includes opinions of attribute values for the attributes specified by one or more of the associated layers. The composite layer 230 can also be referred to as a composite scene description.

In an embodiment, a layer stacking order 235 determines the order in which layers are composited. This in turn specifies how attribute values in one layer override corresponding attribute values in other layers. In an embodiment, layers are assigned a strength in absolute or relative terms. For example, a first layer can include a relative strength value indicating that it is stronger than or weaker than one or more other layers. In this embodiment, opinions of attribute values in stronger layers will be at the "top" of the stacking order and will override opinions of attribute values in weaker layers, i.e. layers that are "lower" in the stacking order. The example layer stacking order 235 is a linear order; however, more complicated layer stacking orders with multiple branches can be utilized. In an embodiment, layer stacking orders can be set or modified by digital production pipeline applications, either manually by a user or automatically by applications. In a further embodiment, the strength of layers is defined at least in part with respect to a root layer, such as root layer 250, which is by default the strongest or highest level layer.

In example layer data structure 200, layer 240 includes opinions 242 and 244 of the value of attributes 210 and 215. However, stacking order 235 places layer 205 as stronger than or ahead of layer 240. Thus, in the composite layer 230, the opinions of value 207 and 212 of layer 205 for attributes 210 and 215 will override corresponding opinions 242 and 244 in layer 240. However, as layer 205 does not define an opinion of value for attribute 247 of component 3, the opinion 245 in layer 240 will define the value of attribute 247 in the composite layer 230.

In an embodiment, layer data structures can be used to correlate or assign dependent data elements to source data elements. FIG. 2B illustrates an example 260 of data correlation in components specified using layer data structures. Example 260 includes a first layer data structure A 265 and a second layer data structure B 275. Layer data structure A 265 includes a specification of component 265 specifying a set of points. Layer data structure B 275 includes a specification of component 280 specifying a set of dependent data elements.

A layer stacking order 280 specifies a composition order for at least layer data structures 265 and 275. Using this layer stacking order 280, a composite layer 285 is determined from layer data structures 265 and 275. The composite layer 285 includes complete authored versions of components 270' and 280'. The dependent data elements of the complete authored version of component 280' are associated with the points of the authored version of component 270'.

In example 260, component 280 is not associated directly with component 270. These components 270 and 280 will only be associated together after layer data structures 265 and 275 are composited together into composite layer 285. Without the layer stacking order 280, the components 270 and 280 defined within layer data structures 265 and 275 have no direct relationship.

As described above, the number and/or order of data elements in components determines the assignment of dependent data elements to points. If the number and/or order of points and/or dependent data elements in components 265 or 275 is changed, the assignment of dependent data elements to points will also be changed. Additionally, intervening or stronger layer data structures can also change the assignment of dependent data elements to points without modifying layer data structures 265 or 275 or components 270 or 275. For example, if layer C 290 includes a component 295 that reorders a set of points in any weaker layer data structure, then component 295 will reorder the set of points in component 270 if it is included in the composite layer 285. As a result, the assignment of dependent data elements to points will be altered, even if the components 270 and 280 are unchanged.

To prevent correlated data in components from being inadvertently altered by modifications to components or the addition of new components, an embodiment of the invention includes methods for detecting changes to correlated data and applying corrections to data to preserve data correlation.

Figure 3A:
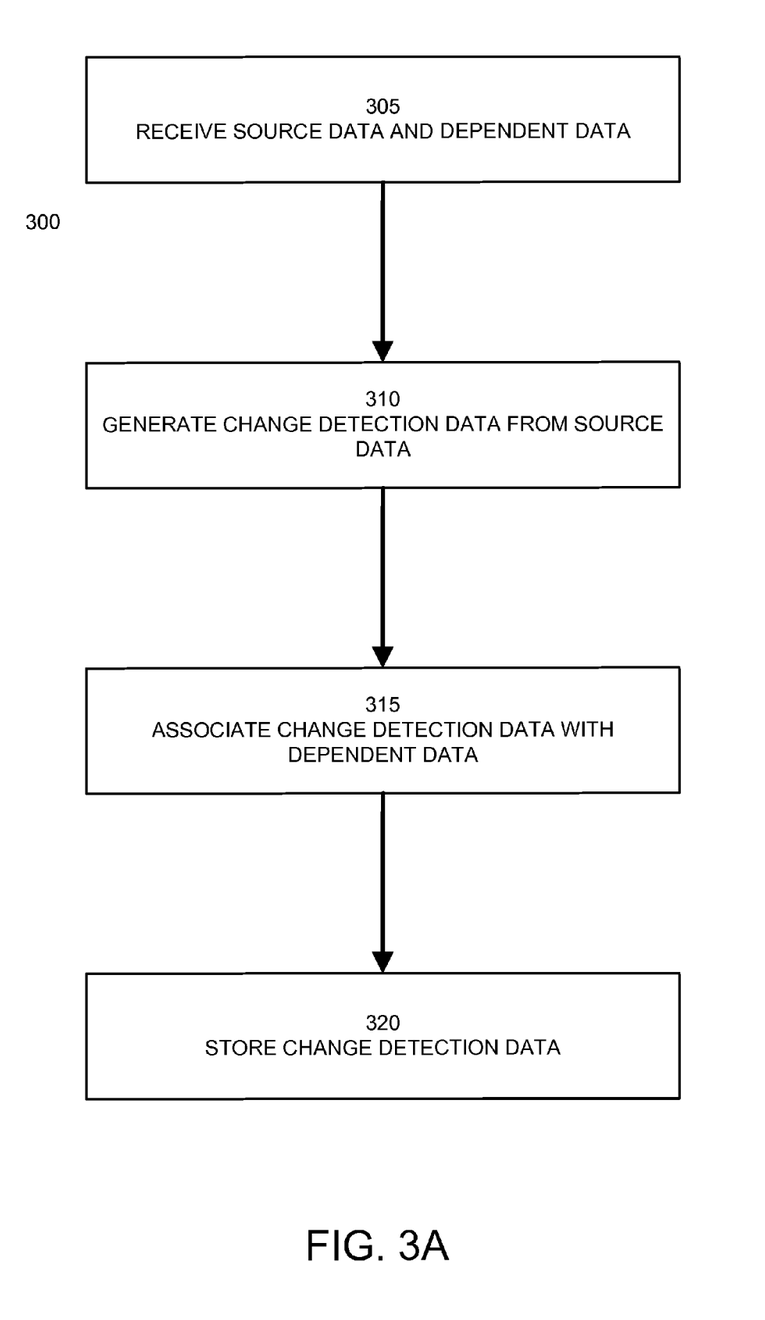
FIGS. 3A and 3B illustrate methods of preserving data correlation according to an embodiment of the invention.
Figure 3B:
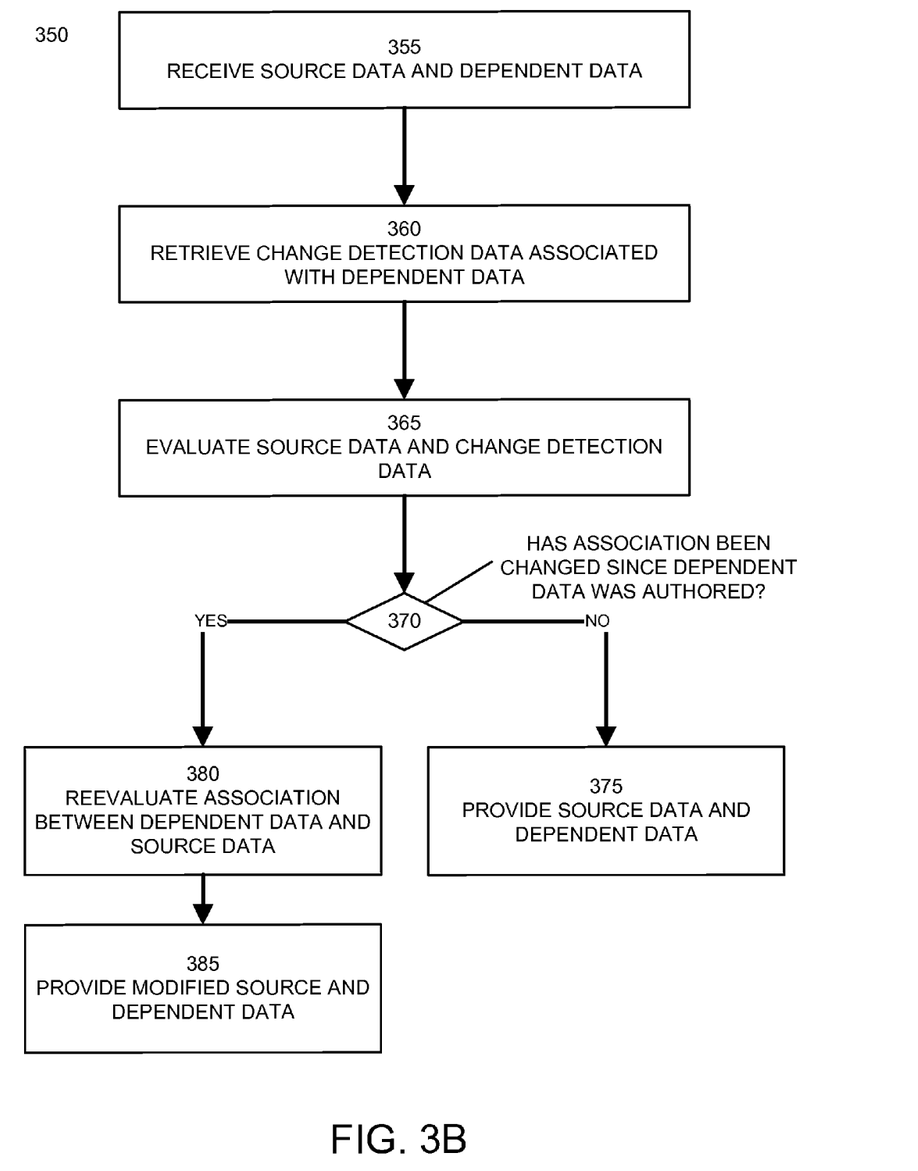

FIGS. 3A and 3B illustrate methods of preserving data correlation according to an embodiment of the invention. FIG. 3A illustrates a method 300 of processing correlated data to preserve data correlation. Step 305 receives source data and dependent data from a user or an application.

In general, source data is any type of data or data elements within a computer graphics component. Examples of source data include geometry data, such as mesh data, particles, analytic specifications of geometry like NURBS, volumetric specifications of geometry like voxels or brick maps, implicit surfaces, and lattices or meshes with interior topology such as lattices; lighting and shading data, such as texture maps, displacement maps, normal and bump maps, environment maps, shadow maps, and other arrays of lighting and shading data, lighting and shading programs, illumination data like ambient occlusion and global illumination data, atmospheric shading effects, subsurface scattering data, and illumination relationships specifying the influence of lights on objects; articulation data including deformer functions, deformer networks, and deformer weights; animation data such as animation variable values; and simulation data.

In general, dependent data is any type of data that is associated with one or more data elements. Dependent data may be one-dimensional or multi-dimensional data defining the influence of one computer graphics component on all or a portion of the data elements of another computer graphics component. Dependent data elements can include any arbitrary type or structure of data, including scalar data, vector data, tuple data, array data, data structures, and data objects. Dependent data may be used for any purpose, including for example specifying the weight or effect of deformer functions on points, specifying other articulation or animation effects, specifying illumination and shading operations, specifying color specifying simulation effects, or any other type of computer graphics effect. Dependent data may also be similar in type to the examples of source data described above and include geometry data, lighting and shading data, articulation data, animation data, and simulation data.

Dependent data may be associated with source data implicitly, such as through the parallel ordering of sets of data elements of source data and dependent data. Dependent data may be associated with source data indirectly, such as through indices or pointers. Dependent data may also be associated with source data directly, for example by assigning dependent data to source data using names or other identifiers.

In an embodiment, a software application retrieves source data from one or more computer graphics components and allows users or applications to create and/or assign dependent data to the source data. Upon receiving the assignment of dependent data to source data, the application provides the source data, the dependent data, and optionally the assignment data specifying the association between the source data and the dependent data to step 305 of method 300. Embodiments of step 305 may receive the assignment of dependent data to source data as the result of resolving a reference relationship, compositing layer data structures, or any other process that identifies an association between the dependent data and source data.

Step 310 determines change detection data from at least the source data. In an embodiment, change detection data includes a checksum, hash, or other data characterization or error detection data. The change detection data is adapted to identify if any of the source data is modified at a future time.

In a further embodiment, the change detection data includes data used to potentially correct the assignment of dependent data to source data following any changes to the source data or the dependent data. In an embodiment, the change detection data includes data specifying the assignment or other relationship between each data element of the dependent data and one or more data elements of the source data. For example, if dependent data such as weights are assigned to source data such as points based on the names or identifiers of points, then the change detection data may include the names of one or more points assigned to each weight.

In another example, if dependent data such as weights are assigned to source data such as points based on a parallel ordering of sets of weights and points, then the change detection data may include a copy of all or a portion of the point data. In this example, the copy of the point data may include point positions in space and/or topological data, such as the connectivity between points. For other types of source data, the change detection data may include a copy of all of or a portion of the source data. As discussed below, in an embodiment, the amount and type of source data included as a copy in the change detection data depends on the technique used to correct the assignment of dependent data to source data.

Step 315 associates the change detection data generated from at least the source data with the dependent data, such that each data element of the dependent data can identify if its associated source data has been potentially changed. Step 315 also associates the change detection data with its source data such that an embodiment of the invention may correct the assignment of dependent data to source data if the source data is modified.

Step 320 stores the change detection data for future retrieval. In an embodiment, change detection data is stored in association with its dependent data. In a further embodiment, if dependent data is specified in one or more layer data structures, then the change detection data is stored in association with the corresponding layer data structures.

Following the processing of correlated data to preserve data correlation in method 300, the change detection data associated with dependent data is evaluated when dependent data is composited to determine if the previously specified assignments between source data and dependent data are still valid. FIG. 3B illustrates a method 350 for detecting changes to correlated data and for applying corrections to data to preserve data correlations.

At step 355, method 350 receives source data and dependent data. Step 355 may receive the source data and dependent data from one or more computer graphics applications. For example, source data and dependent data may be defined in components associated with each other via an implicit or explicit reference. In this example, method 350 is automatically invoked following the resolution of references between components to determine the authored state of components.

In another example, source data and dependent data may be defined by computer graphics components specified within layer data structures. In an embodiment, method 350 is automatically invoked and provided with source data and dependent data during a layer composition operation used to determine the authored state of one or more computer graphics components.

As described above, data elements specified in different components and/or layer data structures may be uncorrelated until references are resolved and/or layers are composited. Similarly, the effect of components in intervening layers on source data is undetermined until the intervening layers are included in the layer composition. In an embodiment, step 355 receives the source data and the dependent data following a preliminary resolution of data and/or a preliminary composition of the layer data structures including the source data and the dependent data, and optionally including additionally layer data structures that include components potentially affecting the source data or dependent data. The result of this preliminary resolution and/or composition is used to determine the current associations or correlations between source data and dependent data for comparison with the change detection data.

Step 360 retrieves the change detection data previously associated with the dependent data. As described above, an embodiment of the invention generates and stores change detection data as dependent data is authored or initially assigned to source data.

Step 365 evaluates the change detection data and the source data to determine if the source data has been modified, either from the components including the source data directly or by the operation of an intervening component. In one implementation, step 365 determines a checksum, hash, or other data characterization or error detection data from the received source data and compares it with the change detection data. In another implementation, some or all of the attributes of the source data are compared with corresponding copies of these attributes previously stored in the change detection data. For example, change detection data for a set of weights may include the positions and/or topology of their assigned points. In this example, step 365 compares the positions and/or topology of the received source data with the corresponding attributes previously included in the change detection data.

Decision block 370 determines if a change to the association between source data and dependent data has occurred since the dependent data was assigned to the source data. Decision block 370 may determine that a change in the association has occurred if the source data is changed or if an intervening layer or other computer graphics component affects the source data and/or the dependent data. For example, if an intervening layer modifies the order of data elements in the source data, the resulting association between the source data and the dependent data will differ from that represented by the change detection data when the dependent data was authored. In this example, decision block 370 bases its determination on the associations between individual data elements within the source and dependent data.

In a further embodiment, decision block 370 may also base its determination in the association as a whole between the source data and the dependent data. For example, the dependent data may be a set of weights initially associated with a large set of points. However, after compositing one or more layers and/or resolving one or more references to components, a substantial number of this set of points may be associated with zero- or null-valued weights. For example, a layer data structure may alter the set of weights, setting some or all of them to zero or null values. Because of their associated zero-valued weights, these points may be omitted from the composited component, as they have no effect. In an embodiment, step 370 may determine that the association between source data and dependent data has changed due to the nullification of some points, even if the weights associated with the remaining points are unchanged.

If no change to the association between the source data and the dependent data has occurred, then step 375 provides the source data and the dependent data specifying the complete authored state of one or more components.

Conversely, if decision block 370 determines that a change to the association between the source data and the dependent data has occurred since the dependent data was assigned to the source data, step 380 reevaluates the associations between dependent data and source data. Step 380 may use any technique known in the art for transferring attributes between different geometries, topologies, or other types of data sets.

For example, if the source data includes a set of points and the dependent data includes a set of associated weights, one embodiment of step 380 determines the current position in two-dimensional or three-dimensional space of each point in the source data. This embodiment of step 380 then uses the change detection data to determine the previous position in two-dimensional or three-dimensional space of each point assigned to a weight. For each point in the current source data, an embodiment of step 380 selects the nearest previous position of a point. Step 380 then assigns the weight associated with this previous point position to the point in the source data having the nearest current position. In this embodiment, some points may not be reassigned to weights and some weights may not be reassigned to points.

In another embodiment of step 380, the dependent data elements associated with previous source data elements are mapped to the associated locations in space. This is used to define a spatial field of dependent data elements. Points are assigned new dependent data element values based on their current positions within this spatial field of dependent data elements, using linear or non-linear interpolation if necessary to determine dependent data elements values at intermediate locations.

In still another embodiment, the topology, rather than positions of source data elements, is used to reassign dependent data elements to source data elements. For example, an initial version of the source data may specify topological connectivity for points, such as edges, polygons, or surface definitions. An embodiment of step 380 reassigns dependent data elements to points based on their nearest topological neighbors. In this embodiment, the positions of points is disregarded in favor of the topological relationships between points.

In further embodiments, the change detection data may be used to direct or hint at an appropriate reassignment between source data and dependent data. In additional embodiments, step 380 may rely partially or entirely on user input to specify a reassignment between source data and dependent data.

Although the above examples illustrate embodiments of step 380 using points and weights, embodiments of step 380 and method 350 may be used with any type of source or dependent data. For example, the embodiments of step 380 using positional data to reassign dependent data to source data may be applied to any type of data that can be expressed in terms of space and distance, including multi-dimensional vector spaces. Similarly, the embodiments of step 380 using topological data to reassign dependent data to source data may be applied to any type of data arranged in an explicit or implicit order or structure.

In still further embodiments, step 380 may optimize the source and dependent data to efficiently represent the associations between these two data sets. For example, if some of the source data is nullified by layer compositing, so that the source data has no effect on the authored state of a computer graphics component, step 380 may reindex or compact the source data and/or the dependent data to eliminate references to the nullified source data in the authored state of the computer graphics component.

The result of step 380 is modified dependent data that has been reassigned to the source data to preserve data correlation between the source data elements and the dependent data elements. Following step 380, step 385 provides the source data and the modified dependent data that determines the complete authored state of one or more components. Following steps 375 or 385, method 350 may be repeated for any additional sets of source data and dependent data identified by preliminary reference resolution or layer composition.

Figure 4:
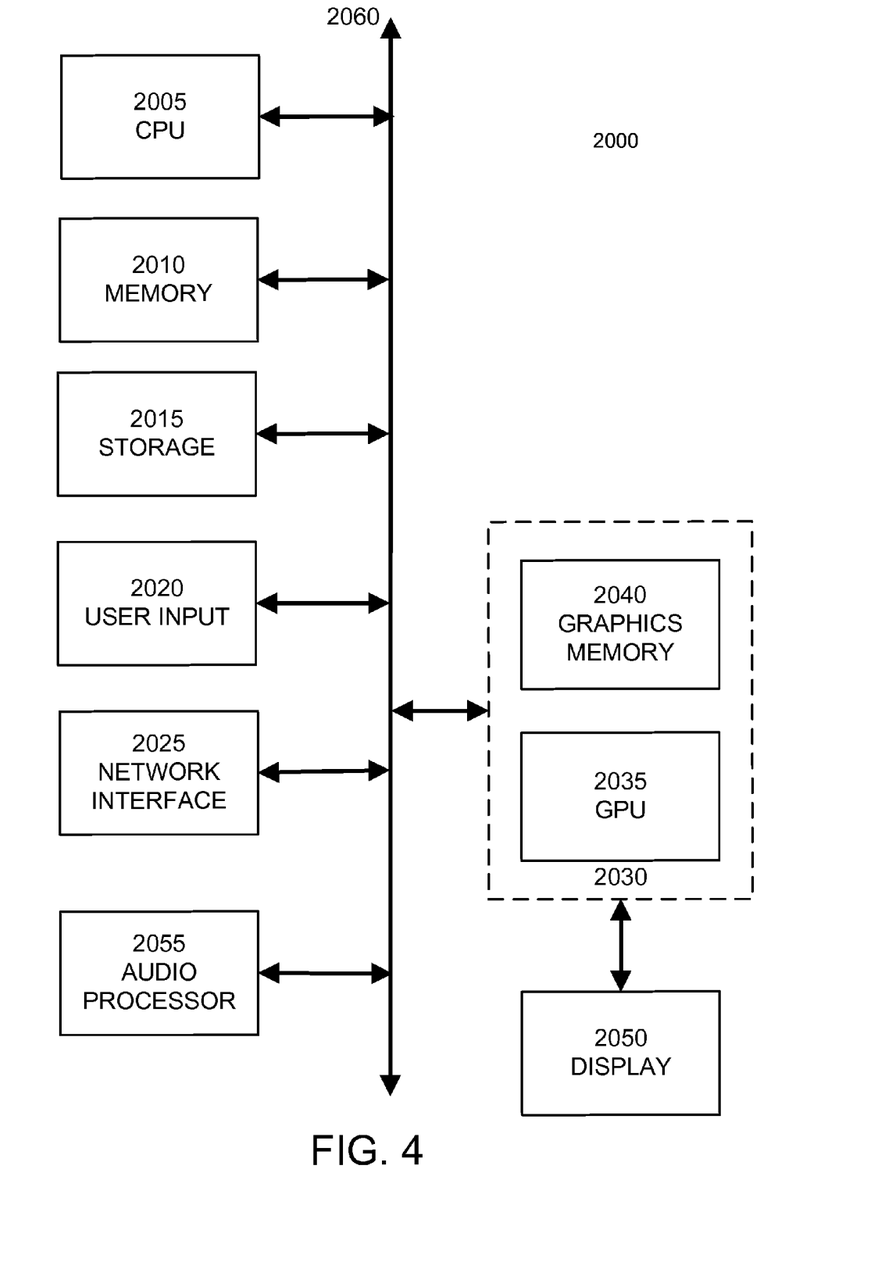
FIG. 4 illustrates a computer system suitable for implementing an embodiment of the invention.

FIG. 4 illustrates a computer system 2000 suitable for implementing an embodiment of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A non-transitory computer-readable medium including instructions executable to perform an operation to preserve deformer attribute assignments invalidated by changes to underlying mesh points in an asynchronous collaborative authoring system of a digital production pipeline for computer animation, the operation comprising:
    receiving: (i) a plurality of interconnected mesh points defining a geometric model and (ii) a plurality of deformer attributes defining movement and deformation of the plurality of interconnected mesh points, the plurality of interconnected mesh points are modifiable independently from the plurality of deformer attributes in the asynchronous collaborative authoring system of the digital production pipeline for computer animation;
    upon determining that a change to at least a first of the plurality of interconnected mesh points has invalidated at least a first of the plurality of deformer attributes that defines movement and deformation of the first mesh point, preserving the first deformer attribute by operation of one or more computer processors when executing the instructions, by automatically reassigning the first deformer attribute to a second of the plurality of interconnected mesh points selected based on reassignment criteria; and
    subsequent to reassigning the first deformer attribute to the second mesh point, generating an animated sequence by rendering a sequence of images of a scene as the scene changes over time, the scene including the geometric model, wherein the animated sequence is output;
    wherein the geometric model is represented as a plurality of model layers including: (i) a first layer specifying the plurality of deformer attributes; and (ii) a second layer specifying the plurality of interconnected mesh points; wherein the change is specified in an intervening layer between the first and second layers.

2. The non-transitory computer-readable medium of claim 1, wherein the change comprises a designation of the first mesh point as no longer being valid.

3. The non-transitory computer-readable medium of claim 1, wherein the plurality of deformer attributes are implicitly assigned to the plurality of interconnected mesh points.

4. The non-transitory computer-readable medium of claim 1, wherein the plurality of deformer attributes are indirectly assigned to the plurality of interconnected mesh points.

5. The non-transitory computer-readable medium of claim 1, wherein the plurality of deformer attributes are directly assigned to the plurality of interconnected mesh points.

6. The non-transitory computer-readable medium of claim 1, wherein each of the plurality of interconnected mesh points is modifiable independently from one another and from the plurality of deformer attributes, and by different users in the asynchronous collaborative authoring system, wherein the deformer attribute assignments are invalidated due to the change to the underlying mesh points as a result of asynchronous editing actions from different authors of the asynchronous collaborative authoring system.

7. The non-transitory computer-readable medium of claim 6, wherein the instructions are executable to independently preserve each of a plurality of distinct types of mesh-point attributes, including deformer attributes, lighting attributes, shading attributes, texture-map attributes, displacement-map attributes, normal-map attributes, bump-map attributes, environment-map attributes, shadow-map attributes, illumination attributes, articulation attributes, animation attributes, and simulation attributes, wherein each type is preserved by automatically reassigning mesh-point attributes of the respective type.

8. The non-transitory computer-readable medium of claim 7, wherein the plurality of model layers is ordered by decreasing precedence as defined by a layer stacking order and as specified by: (i) a primary layer comprising the first layer; (ii) a secondary layer comprising the intervening layer; and (ii) a tertiary layer comprising the second layer; wherein the primary layer includes each of the plurality of distinct types of mesh-point attributes, wherein each of the plurality of distinct types of mesh-point attributes of the primary layer characterize the plurality of interconnected mesh points of the tertiary layer;
    wherein each layer is overridable by any layer of higher precedence, wherein each layer is stored as a distinct and uniquely identifiable data structure, wherein the reassignment criteria specify to use, in respective instances, linear interpolation, non-linear interpolation, nearest topological neighbor determination, and multi-dimensional vector-space position determination, wherein the operation further comprises compositing the primary, secondary, and tertiary layers prior to generating the animated sequence and in order to generate a composited layer.

9. The non-transitory computer-readable medium of claim 8, wherein the operation further comprises:
    generating change detection data adapted for detecting a change to the plurality of interconnected mesh points subsequent to definition of the plurality of deformer attributes;
    wherein prior to the change to the first interconnected mesh point, the plurality of deformer attributes are assigned to the plurality of interconnected mesh points via first indices;
    wherein subsequent to the change to the first interconnected mesh point, the plurality of deformer attributes are reassigned to the plurality of interconnected mesh points via second indices.

10. The non-transitory computer-readable medium of claim 9, wherein the change to the first mesh point is detected by:
    compositing the primary and tertiary layers in order to determine a composited association between the plurality of deformer attributes and the plurality of interconnected mesh points; and
    comparing the plurality of interconnected mesh points with the change detection data and based on the composited association in order to detect the change to the first mesh point.

11. The non-transitory computer-readable medium of claim 10, wherein the change comprises a designation of the first mesh point as no longer being valid, wherein the change detection data includes, in respective instances: (i) topological data and (ii) geometric data; wherein the plurality of deformer attributes is assigned to the plurality of interconnected mesh points, in respective instances: (i) implicitly; (ii) indirectly; and (iii) directly; wherein the change detection data, in respective instances: (i) characterizes the plurality of interconnected mesh points; and (ii) includes a copy of at least a portion of the plurality of interconnected mesh points.

12. A non-transitory computer-readable medium including instructions executable to perform an operation to preserve deformer attribute assignments invalidated by changes to underlying mesh points in an asynchronous collaborative authoring system of a digital production pipeline for computer animation, the operation comprising:

receiving a geometric model comprising a plurality of model layers including: (i) a mesh layer specifying a plurality of interconnected mesh points defining the geometric model and (ii) a deformer layer specifying a plurality of deformer attributes defining movement and deformation of the plurality of interconnected mesh points, wherein the plurality of interconnected mesh points are modifiable independently from the plurality of deformer attributes in the asynchronous collaborative authoring system of the digital production pipeline for computer animation;

upon determining that a change to at least a first of the plurality of interconnected mesh points has invalidated at least a first of the plurality of deformer attributes that defines movement and deformation of the first mesh point, preserving the first deformer attribute by operation of one or more computer processors when executing the instructions, by automatically reassigning the first deformer attribute to a second of the plurality of interconnected mesh points selected based on reassignment criteria . . . wherein the change is specified in an intervening layer between the mesh and deformer layers; and subsequent to reassigning the first deformer attribute to the second mesh point, generating an animated sequence by rendering a sequence of images of a scene as the scene changes over time, the scene including the geometric model comprising the plurality of model layers, wherein the animated sequence is output.

13. The non-transitory computer-readable medium of claim 12, wherein the change comprises a designation of the first mesh point as no longer being valid.

14. The non-transitory computer-readable medium of claim 12, wherein the plurality of deformer attributes are implicitly assigned to the plurality of interconnected mesh points.

15. The non-transitory computer-readable medium of claim 12, wherein the plurality of deformer attributes are indirectly assigned to the plurality of interconnected mesh points.

16. The non-transitory computer-readable medium of claim 12, wherein the plurality of deformer attributes are directly assigned to the plurality of interconnected mesh points.

17. The non-transitory computer-readable medium of claim 12, wherein each of the plurality of interconnected mesh points is modifiable independently from one another and from the plurality of deformer attributes, and by different users in the asynchronous collaborative authoring system.

18. A computer-implemented method to preserve deformer attribute assignments invalidated by changes to underlying mesh points in an asynchronous collaborative authoring system of a digital production pipeline for computer animation, the computer-implemented method comprising:

receiving a geometric model comprising a plurality of model layers including: (i) a mesh layer specifying a plurality of interconnected mesh points defining the geometric model and (ii) a deformer layer specifying a plurality of deformer attributes defining movement and deformation of the plurality of interconnected mesh points, wherein the plurality of interconnected mesh points are modifiable independently from the plurality of deformer attributes in the asynchronous collaborative authoring system of the digital production pipeline for computer animation;

upon determining that a change to at least a first of the plurality of interconnected mesh points has invalidated at least a first of the plurality of deformer attributes that defines movement and deformation of the first mesh point, preserving the first deformer attribute by operation of one or more computer processors and by automatically reassigning the first deformer attribute to a second of the plurality of interconnected mesh points selected based on reassignment criteria, wherein the change is specified in an intervening layer between the mesh and deformer layers; and subsequent to reassigning the first deformer attribute to the second mesh point, generating an animated sequence by rendering a sequence of images of a scene as the scene changes over time, the scene including the geometric model comprising the plurality of model layers, wherein the animated sequence is output.

19. The computer-implemented method of claim 18, wherein the change comprises a designation of the first mesh point as no longer being valid.

20. The computer-implemented method of claim 18, wherein the plurality of deformer attributes are implicitly assigned to the plurality of interconnected mesh points.

21. The computer-implemented method of claim 18, wherein the plurality of deformer attributes are indirectly assigned to the plurality of interconnected mesh points.

22. The computer-implemented method of claim 18, wherein the plurality of deformer attributes are directly assigned to the plurality of interconnected mesh points.

23. The computer-implemented method of claim 18, wherein each of the plurality of interconnected mesh points is modifiable independently from one another and from the plurality of deformer attributes, and by different users in the asynchronous collaborative authoring system.

24. The computer-implemented method of claim 18, wherein the plurality of model layers is ordered by precedence as defined by a layer stacking order.

\* \* \* \* \*

UNITED STATES PATENT AND TRADEMARK OFFICE
CERTIFICATE OF CORRECTION

PATENT NO. : 9,582,247 B1
APPLICATION NO. : 13/419886
DATED : February 28, 2017
INVENTOR(S) : Timothy S. Milliron et al.

It is certified that error appears in the above-identified patent and that said Letters Patent is hereby corrected as shown below:

In the Claims

In Column 14, Line 21, in Claim 8, delete "(ii)" and insert -- (iii) --, therefor.

In Column 15, Line 34, in Claim 12, delete "criteria ..." and insert -- criteria, --, therefor.

Signed and Sealed this
Second Day of May, 2017

Michelle K. Lee
*Director of the United States Patent and Trademark Office*